United States Patent [19]

Heine et al.

[11] 4,137,334

[45] Jan. 30, 1979

[54] PROCESS FOR PRESERVING THE FRESHNESS OF FRESH MEAT USING ACETYLATED FATTY ACID MONO-, DI-, AND TRIGLYCERIDES

[75] Inventors: Christian Heine, Monheim; Reinhold Wüst, Kaarst b. Neuss; Brigitte Kamp, Düsseldorf-Wersten, all of Fed. Rep. of Germany

[73] Assignee: Henkel Kommanditgesellschaft auf Aktien (Henkel KGaA), Düsseldorf-Holthausen, Fed. Rep. of Germany

[21] Appl. No.: 834,430

[22] Filed: Sep. 19, 1977

[30] Foreign Application Priority Data

Sep. 27, 1976 [DE] Fed. Rep. of Germany ....... 2643370

[51] Int. Cl.² ............................................... A23B 4/10
[52] U.S. Cl. .................................... 426/310; 426/641; 426/92

[58] Field of Search ................. 426/92, 310, 332, 641

[56] References Cited

U.S. PATENT DOCUMENTS

| | | | |
|---|---|---|---|
| 3,406,081 | 10/1968 | Bauer et al. | 426/310 |
| 3,667,970 | 6/1972 | Scheide | 426/92 |
| 3,851,077 | 11/1974 | Stemmler et al. | 426/310 X |

*Primary Examiner*—Robert A. Yoncoskie
*Attorney, Agent, or Firm*—Hammond & Littell

[57] ABSTRACT

A method of prolonging the freshness of fresh meat by immersion of the meat in a mixture of glycerides containing a completely acetylated mixture of 35 to 75 weight percent fatty acid monoglyceride, 5 to 50 weight percent fatty acid diglyceride and 5 to 30 weight percent fatty acid triglyceride, the fatty acids having 12 to 22 carbon atoms and consisting of 70 to 100 mole percent unsaturated fatty acids at a temperature of from 1° to 16° C.

7 Claims, No Drawings

PROCESS FOR PRESERVING THE FRESHNESS OF FRESH MEAT USING ACETYLATED FATTY ACID MONO-, DI-, AND TRIGLYCERIDES

RELATED ART

The prolongation of the freshness of fresh meat is of considerable economic importance. To achieve this objective a variety of measures are employed, such as storage in refrigeration plants, coating with vaporization-inhibiting protective layers, use of preservative additives, etc. All these measures, however, have disadvantages in that they lead to weight losses or discolorations or do not leave the meat in its natural state.

German Published Application DOS No. 22 60 685 discloses a method which avoids the above disadvantages and maintains the meat in an excellent state of freshness for a relatively long time. The process is to spray the fresh meat with a completely acetylated distilled monoglyceride prepared from lard, cottonseed oil or partially hydrogenated vegetable oil and to maintain the coated meat at a temperature of 1 to 16° C., depending on the solidification point of the acetylated monoglyceride, or to immerse the meat in the monoglyceride. The fresh meat is then stored at a temperature of 1 to 16° C., preferably at 1 to 4° C.

The completely acetylated monoglycerides used in this process must be subjected to a careful molecular distillation, or molecularly distilled monoglycerides must be used for reaction with acetic anhydride. In any case, therefore, molecular distillation is necessary. This makes the production of the completely acetylated monoglycerides relatively expensive. Besides, these products have solidification points which lie near or above the preferred storage temperature of the meat of 1 to 4° C. In this temperature range, therefore, they are solid or have so high a viscosity that it becomes necessary to heat up or melt the material when the meat is taken out of storage.

There is a need, therefore, for products which serve as superior preservatives for meats but which are easier and less costly to produce and have lower solidification points than the products of DOS No. 22 60 685.

OBJECTS OF THE INVENTION

An object of the present invention is the development of a method for preserving the freshness of fresh meat by treating the meat with a glyceride preservative which prevents weight loss and discoloration of the meat and leaves the meat in its natural state for a relatively long time and which has good handling characteristics at the storage temperature of the meat due to its liquid condition.

Another object of the present invention is the development of an improved process for prolonging the fresh state of fresh meat by treating the meat with a glyceride mixture which contains, as an essential component, a completely acetylated mixture of fatty acid monoglycerides, diglycerides and triglycerides in an amount sufficient to keep the preservative mixture in a liquid or semiliquid state in the temperature range at which the meat is stored.

A further object of the present invention is to improve on the known process of prolonging the freshness of fresh meat by immersion of the meat in a completely acetylated molecularly distilled monoglyceride from lard, cottonseed oil or partially hydrogenated vegetable oil and storage at a temperature of 1 to 16° C., said improvement consisting of either partially or wholly replacing said molecularly distilled monoglyceride by a completely acetylated mixture of 35 to 75 weight percent fatty acid monoglyceride, 5 to 50 weight percent fatty acid diglyceride, and 5 to 30 weight percent fatty acid triglyceride, the fatty acids having 12 to 22 carbon atoms and consisting of 70 to 100 mole percent unsaturated fatty acids.

A still further object of the present invention is the development of glyceride meat preservatives which can be relatively easily and economically produced and which have low solidification points, thereby avoiding any undue heating when the meat is taken out of storage.

These and other objects of the invention will become more apparent as the description thereof proceeds.

DESCRIPTION OF THE INVENTION

It has now been discovered that the objectionable features of the prior art methods of preserving meat have been overcome and the above objects have been achieved by the development of a process for prolonging the fresh state of fresh meat by treating the meat with a glyceride mixture preservative which contains, as an essential component, a completely acetylated mixture of fatty acid monoglycerides, diglycerides and triglycerides in an amount sufficient to keep the preservative mixture in a liquid or semiliquid state in the temperature range at which the meat is stored.

The invention represents an improved process for prolonging the fresh state of fresh meat of the type wherein the meat is immersed in a completely acetylated molecularly distilled monoglyceride from lard, cottonseed oil or partially hydrogenated vegetable oil and is stored at a temperature of 1 to 16° C., wherein the improvement comprises (1) either partially or wholly replacing said completely acetylated molecularly distilled monoglyceride with an amount of a completely acetylated mixture of a fatty acid monoglyceride, a fatty acid diglyceride and a fatty acid triglyceride, the fatty acids having 12 to 22 carbon atoms and consisting of 70 to 100 mole percent unsaturated fatty acids, said amount being sufficient to keep the glyceride mixture in a liquid or semiliquid state in the temperature range at which the meat is stored.

More particularly, the present invention relates to a process for prolonging the fresh state of fresh meat by (A) treating the meat, especially by immersion, with a glyceride preservative mixture which comprises (1) from 0 to 50% by weight, relative to the total weight of said mixture, of a completely acetylated molecularly distilled monoglyceride, obtainable from lard, cottonseed oil or partially hydrogenated vegetable oil, and (2) from 50 to 100% by weight, relative to the total weight of said mixture, of a competely acetylated mixture of fatty acid monoglycerides, diglycerides and triglycerides, wherein the fatty acids have 12 to 22 carbon atoms and consist of 70 to 100 mole percent unsaturated fatty acids, and wherein the fatty acid glycerides preferably consist of 35 to 75 weight percent fatty acid monoglyceride, 5 to 50 weight percent fatty acid diglyceride and 5 to 30 weight percent fatty acid triglyceride, and (B) storing the meat at a temperature which prevents spoilage, preferably at 1 to 16° C., more preferably at 1 to 4° C.

The completely acetylated mixture of fatty acid monoglycerides, diglycerides and triglycerides of the invention can be prepared in known manner by transesterification of triglycerides of the fatty acids of the composition with glycerin triacetate, or can be prepared from the corresponding mixtures of fatty acid mono-, di- and triglycerides by direct acetylation with acetic anhydride and subsequent distillation of excess glycerin triacetate, acetic acid or acetic anhydride under vacuum, or by mixing the acetylated mono- and diglycerides of the invention with triglycerides. Given acetylation mixtures, e.g., from natural triglycerides, can be modified as desired and influenced in their properties by admixing an additional component, e.g., acetylated monoglyceride. The individual components of the mixtures can derive from the same or from different natural triglycerides.

Naturally occurring triglyceride mixtures having a high content of unsaturated fatty acids, such as oleic acid, linoleic acid, and palmitoleic acid, are preferred as starting materials in the preparation of the completely acetylated fatty acid glycerides of the invention. To obtain solidification points as low as possible, it is desirable that as high a proportion as possible of the fatty acids should consist of unsaturated fatty acids, preferably oleic acid. Oleic acid advantageously constitutes 50% by weight or more of the fatty acids of the glyceride mixtures of the invention.

The completely acetylated mixture of glycerides of the invention can contain various conventional constituents ordinarily used in such preservative compositions in their ordinarily effective amounts. For example, it may prove advantageous to add antioxidants, such as α-tocopherol, butylated hydroxyanisole, butylated hydroxytoluene, ascorbyl palmitate, citric acid, etc., to enhance resistance against spoilage.

The meat to be treated in accordance with the invention can be contacted with the glyceride preservatives of the invention by any convenient method, such as by immersion of the meat in the glyceride mixture or by spraying the meat with the mixture. Immersion of the meat in the glyceride mixture has been found to be a particularly advantageous method.

Preferably, the completely acetylated glycerides of the invention contain 50 to 65 weight percent acetylated fatty acid monoglyceride, 20 to 35 weight percent acetylated fatty acid diglyceride, and 10 to 20 weight percent fatty acid triglyceride. The proportion of unsaturated fatty acids is preferably 80 to 95 mole percent of the fatty acid content of the completely acetylated glycerides of the invention.

In one embodiment, the invention provides a process for prolonging the freshness of meat wherein the preservative consists of a completely acetylated mixture of fatty acid monoglycerides, fatty acid diglycerides and fatty acid triglycerides. According to another embodiment of the invention, a process for preserving meat is provided in which the known preservative obtainable from lard, cottonseed oil or partially hydrogenated vegetable oil, i.e., completely acetylated molecularly distilled monoglyceride, is partially replaced by the above-mentioned completely acetylated mixture of fatty acid monoglycerides, fatty acid diglycerides and fatty acid triglycerides. The partial replacement is effected to the extent necessary to produce a glyceride composition which is liquid or similiquid in the suitable temperature range for storing meats. The percentage of completely acetylated fatty acid glycerides required to achieve this result can be readily determined. Advantageously, such percentage is used which results in a glyceride composition which is liquid or semiliquid, preferably liquid, in the temperature range of 1 to 16° C.; more preferably that percentage is used which yields a liquid or semiliquid, preferably liquid, glyceride mixture in the preferred temperature range for meat storage, i.e., 1 to 4° C. The completely acetylated fatty acid glycerides of the invention can constitute, for example, from 60 to 100, more preferably from 50 to 100, weight percent of the glyceride preservative mixtures of the invention.

The glyceride preservative mixtures of the invention constitute clear, yellowish oils with cloud points below 4° C., preferably from 0° to −13° C. Therefore, they remain clear and liquid in the preferred temperature range for meat storage of 1 to 4° C. If these glyceride mixtures have cloud points below 0° C., they additionally have a low viscosity in this temperature range, so that heating is not necessary when the meat is taken out of storage. The freshness preserving qualities of the products to be used according to the invention are equivalent to those of the known preservatives, or are superior to them because of the possibility of storing the meat at lower temperatures.

The invention also includes a preservative composition which comprises (1) from 0 to 50% by weight, relative to the total weight of said mixture, of a completely acetylated molecularly distilled monoglyceride, obtainable from lard, cottonseed oil or partially hydrogenated vegetable oil; (2) from 50 to 100% by weight, relative to the total weight of said mixture, of a completely acetylated mixture of 35 to 75 weight percent fatty acid monoglyceride, 5 to 50 weight percent fatty acid diglyceride, and 5 to 30 weight percent fatty acid triglyceride, each relative to the total weight of the completely acetylated mono-, di-, and triglyceride mixture, wherein the fatty acids have 12 to 22 carbon atoms and consist of 70 to 100 mole percent unsaturated fatty acids; and (3) the remainder to 100% by weight of conventional substances used in meat preservative compositions.

The following examples further illustrate the invention, but without limiting the invention to these examples.

EXAMPLES

The following examples present in tabular form the physical characteristics of a number of representative completely acetylated mixtures of mono-, di- and triglycerides which can be used in the process of the invention. All percents in the following examples are weight percents.

EXAMPLE 1

| Completely Acetylated Mixtures of Invention | External constitution at room temperature | Cloud point in ° C. | Acid number | Saponification number | Iodine number |
|---|---|---|---|---|---|
| Completely acetylated mixture of 40% monoglyceride | yellow, oily liquid | −12 | <2 | 330 | 70 |

EXAMPLE 1-continued

| Completely Acetylated Mixtures of Invention | External constitution at room temperature | Cloud point in °C. | Acid number | Saponification number | Iodine number |
|---|---|---|---|---|---|
| 40% diglyceride and 20% triglyceride of a fatty acid mixture of 3% myristic 5% palmitic, 1% stearic, 8% palmitoleic, 72% oleic and 10% linoleic acid | | | | | |

EXAMPLE 2

| Completely Acetylated Mixtures of Invention | External constitution at room temperature | Cloud point in °C. | Acid number | Saponification number | Iodine number |
|---|---|---|---|---|---|
| Completely acetylated mixture of 6% monoglyceride, 30% diglyceride and 10% triglyceride of the fatty acid mixture of Example 1. | yellow, oily liquid | −6 | <2 | 340 | 70 |

EXAMPLE 3

| Completely Acetylated Mixtures of Invention | External constitution at room temperature | Cloud point in °C. | Acid number | Saponification number | Iodine number |
|---|---|---|---|---|---|
| Completely acetylated mixture of 80% monoglyceride, 15% diglyceride and 5% triglyceride of the fatty acid mixture of Example 1. | yellow, oily liquid | 0 | <2 | 360 | 70 |

EXAMPLE 4

| Completely Acetylated Mixtures of Invention | External constituion at room temperature | Cloud point in °C. | Acid number | Saponification number | Iodine number |
|---|---|---|---|---|---|
| Completely acetylated mixture of 80% of the mixture of Example 1 and 20% distilled lard monoglyceride | yellow, oily liquid | −4 | <2 | 330 | 60 |

EXAMPLE 5

| Completely Acetylated Mixture of Invention | External constitution at room temperature | Cloud point in °C. | Acid | Saponification number | Iodine munber |
|---|---|---|---|---|---|
| Completely acetylated mixture of 60% of the mixture of Example 1 and 40% | yellow, oily liquid | −2 | <2 | 330 | 70 |

EXAMPLE 5-continued

| Completely Acetylated Mixture of Invention | External constitution at room temperature | Cloud point in ° C. | Acid | Saponification number | Iodine munber |
|---|---|---|---|---|---|
| distilled sunflower oil monoglyceride. | | | | | |

EXAMPLE 6

Use Example

In a special steel container filled with a completely acetylated mixture of 40% mono-, 40% di- and 20% tri-glycerides of a fatty acid mixture of 72% oleic, 10% linoleic, 8% palmitoleic, 1% stearic, 5% palmitic and 3% myristic acid, cloud point −12° C. (the mixture of Example 1), pieces of beef and pork from a fresh slaughter were suspended at 2° C. and maintained at this temperature.

After 14 days the meat still had the same color and constitution as fresh meat. A notable weight loss had not occurred.

We claim:

1. In a process for prolonging the fresh state of fresh meat, of the type wherein the meat is immersed in a glyceride preservative consisting of completely acetylated molecularly distilled monoglyceride, obtainable from lard, cottonseed oil or partially hydrogenated vegetable oil, and stored at a temperature of 1 to 16° C., the improvement comprising replacing said completely acetylated molecularly distilled monoglyceride with an amount of a completely acetylated fatty acid glyceride mixture comprising 35 to 75 weight percent, relative to the total weight of said fatty acid glyceride mixture, of fatty acid monoglyceride 5 to 50 weight percent, relative to the total weight of said fatty acid glyceride mixture, of fatty acid diglyceride, and 5 to 30 weight percent, relative to the total weight of said fatty acid glyceride mixture, of fatty acid triglyceride, said fatty acids having 12 to 22 carbon atoms and consisting of 70 to 100 mole percent unsaturated fatty acids and said amount of the completely acetylated fatty acid glyceride mixture used as a replacement for the completely acetylated molecularly distilled monoglyceride is at least 50 weight percent of the total glyceride preservative mixture so that said glyceride mixture is in a liquid state in the temperature range from 1 to 16° C.

2. The process of claim 1 wherein said glyceride mixture is in a liquid state at a temperature of 1 to 4° C.

3. The process of claim 1 wherein the completely acetylated fatty acid glyceride mixture comprises 50 to 65 weight percent, relative to the total weight of said fatty acid glyceride mixture, of fatty acid monoglyceride, 20 to 35 weight percent, relative to the total weight of said fatty acid glyceride mixture, of fatty acid diglyceride, and 10 to 20 weight percent, relative to the total weight of said fatty acid glyceride mixture, of fatty acid triglyceride.

4. The process of claim 1 wherein the completely acetylated molecularly distilled monoglyceride is completely replaced by the completely acetylated fatty acid glyceride mixture.

5. The process of claim 4 wherein the unsaturated fatty acid content of the completely acetylated fatty acid glyceride mixture is over 50% by weight of oleic acid, based on the total weight of the fatty acids of the glyceride mixture.

6. The process of claim 4 wherein the fatty acids of the completely acetylated fatty acid glyceride mixture consist of 80 to 95 mole percent unsaturated fatty acids.

7. The process of claim 6 wherein the completely acetylated fatty acid glyceride mixture has a cloud point of 0° to −13° C.

* * * * *